UNITED STATES PATENT OFFICE.

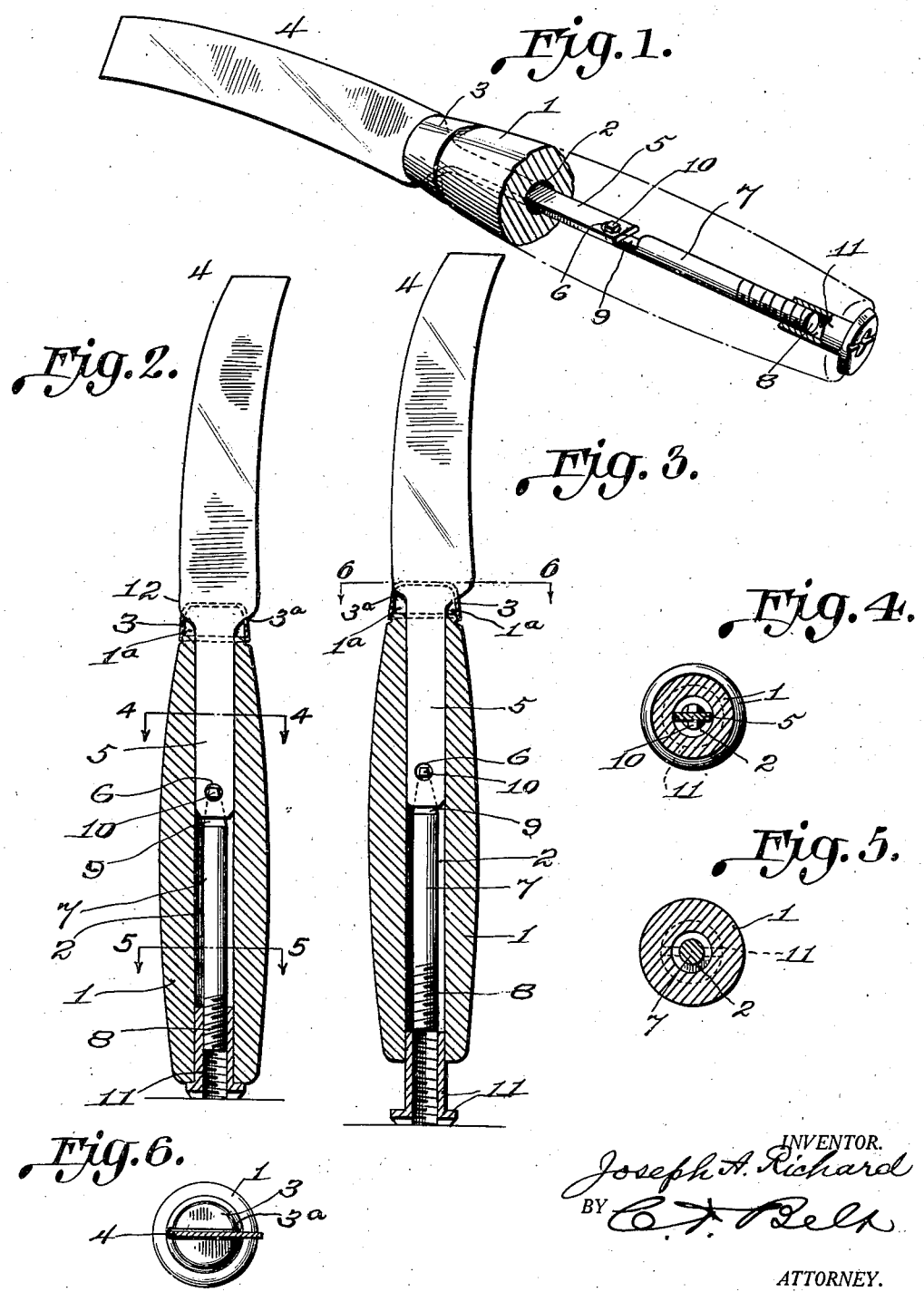

JOSEPH A. RICHARD, OF SOUTHBRIDGE, MASSACHUSETTS.

CONNECTION FOR KNIFE HANDLES AND BLADES.

1,420,342.  Specification of Letters Patent.  Patented June 20, 1922.

Application filed November 6, 1920. Serial No. 422,212.

*To all whom it may concern:*

Be it known that I, JOSEPH A. RICHARD, a citizen of the United States, residing at Southbridge, in the county of Worcester and State of Massachusetts, have invented certain new and useful Improvements in Connections for Knife Handles and Blades, of which the following is a specification.

This invention relates to knives and pertains especially to separable or detachable knife blades and handles and to devices for perfecting rigid attachment of the handle and blade.

The object of the invention is to provide novel and peculiar devices for fixedly connecting a blade shank within a handle, said devices being operated for disconnecting the shank and for permitting the blade and certain of said devices to be withdrawn from the handle for interchanging the knife blades.

A further object of the invention is to provide a knife having a shank extension adapted to be connected with a screw rod which is operated by a hollow set screw working in the butt end of the handle for securing and releasing the blade with respect to the handle.

Various other objects, advantages and improved results are attainable in the manufacture and practical utility of the invention, as will be hereinafter set forth.

In the accompanying drawings forming part of this application:—

Fig. 1 is a perspective view with the handle partly broken away and showing the parts in position as securing the blade to the handle.

Fig. 2 is a longitudinal sectional view showing the blade and the handle fixedly connected.

Fig. 3 is a similar view showing the blade released and the set screw in position for pushing the shank out of the handle.

Fig. 4 is a cross section taken on the dotted line 4—4 Fig. 2.

Fig. 5 is a similar view taken on the dotted line 5—5 Fig. 2.

Fig. 6 is a cross section taken on the dotted line 6—6 Fig. 3.

The same reference characters denote the same parts throughout the several views of the drawings.

It is well known that knife blades for certain character of work, such as shoe knives, farriers' knives, saddlers' knives, and other knives, need to be interchanged to suit the particular character of work required, and also knives of various character are interchanged for various other purposes such as when the cutting edge or point most used becomes so reduced as not to be of further use. It is for these various knives that my blade and handle connection is specially intended, although the connecting device is applicable to any hollow handle and to any blade having a shank handle extension.

In carrying out my invention I employ a handle of any suitable shape and material, but merely for the purpose of exemplification, I have shown a round handle as 1, having a bore 2 extending centrally and longitudinally therethrough, and such handle is provided with the usual slotted ferrule 3 which is removed and replaced with the knife blade 4. The blade has a shank extension 5 provided with an eye or hole 6 adjacent to the outer end of the shank, and the shank is preferably made long enough to extend into the handle bore a considerable distance so as to prevent any lost motion or lateral movement of the shank during the use of the knife.

The anchoring device or means for fixedly connecting the shank with the handle, comprises a stem or rod 7 having a screw threaded outer end 8 adjacent to the butt of the handle, and the other end of the rod has a flattened portion 9 terminating in an upturned lug or hook 10 for loosely fitting the shank eye 6. Said device further comprises a sleeve forming hollow set screw 11 having internal threads extending therethrough and working in the handle bore through the butt end of the handle for screwing onto the screw end of the anchor rod 7, whereby the shank is rigidly secured in the bore of the handle. Said hollow screw 11 being screwed inwardly for pulling the shank into the handle until the shoulder 12 between the blade and its shank is forced against the ferrule. In this position of the parts, as shown in Figs. 1 and 2, the knife may be used in the usual way without danger of loosening or displacement of the blade.

For removing the blade and the screw rod from the handle, the hollow screw 11 is unscrewed from the rod but not withdrawn from the handle, as shown in Fig. 3 of the drawings, and by pushing the screw 11 inwardly against the end of the rod without turning the said screw, the rod forces the shank and blade outwardly so as to be readily removed with the screw rod. The said removal operation I have found most conveniently accomplished by standing the knife in upright position and pushing the handle downwardly, as clearly shown in Fig. 3 of the drawings, which leaves the said hollow screw in position to again receive the screw rod.

I do not wish to be understood as confining my invention to any particular character of knife blade and handle, nor to any particular size, shape and material, but reserve to myself the right to make such changes and variations in the manufacture and practical application of my invention as may come within the scope of the appended claims

Having thus described my invention what I claim as new and desire to secure by Letters Patent is:—

A device of the type described, including a tubular knife-handle, a blade having an extended rectangular shank received within said handle, a slit ferrule applied to the inner end of the handle, its slit engaging the inner end of the blade shank a rod inserted into said tubular handle and having an attenuated terminal provided with a lateral lug, said blade-shank having an eye receiving said lateral lug, and a sleeve arranged interiorly of said handle and having internal threaded connection with said rod and unthreaded with respect to the wall of the bore of said handle.

In witness whereof I hereunto set my hand in the presence of two witnesses.

JOSEPH A. RICHARD.

Witnesses:
  Jos. E. O'Shaughnesy,
  Alfred Laroche.